United States Patent [19]

Bederke et al.

[11] Patent Number: 5,460,892
[45] Date of Patent: Oct. 24, 1995

[54] EMULSIFIER-FREE, HEAT-CURABLE COATING MATERIAL, ITS PREPARATION AND USE

[75] Inventors: Klaus Bederke, Sprockhövel; Volker Duecoffre; Carmen Flosbach, both of Wuppertal; Wolfgang Göldner, Heiligenhaus; Walter Schubert, Wuppertal, all of Germany

[73] Assignee: Herberts Gessellschaft mit beschränkter Haftung, Wuppertal, Germany

[21] Appl. No.: 178,767

[22] Filed: Jan. 7, 1994

[30] Foreign Application Priority Data

Jan. 13, 1993 [DE] Germany ............ 43 00 616.7
May 28, 1993 [DE] Germany ............ 43 17 864.2
Sep. 21, 1993 [DE] Germany ............ 43 32 067.8

[51] Int. Cl.⁶ ............................................. B32B 27/36
[52] U.S. Cl. .................. 428/482; 528/272; 528/274; 528/302; 528/308; 525/437; 525/440; 525/441; 525/444; 525/445; 428/458
[58] Field of Search .................... 528/272, 274, 528/302, 303, 308; 525/437, 440, 444, 441, 445; 428/458, 482

[56] References Cited

U.S. PATENT DOCUMENTS 4,624,973  11/1986  Kuwajima et al. ............ 523/221
5,015,688   5/1991  Bederke et al. ............... 524/600

FOREIGN PATENT DOCUMENTS 3319013  11/1984  Germany.
1129073   5/1989  Japan.

OTHER PUBLICATIONS

WPI Abstract 89–18955/26.
WPI Abstract 84–301243/49.

Primary Examiner—Samuel A. Acquah
Attorney, Agent, or Firm—Merchant Gould Smith Edell Welter & Schmidt

[57] ABSTRACT

A coating material is described which exhibits high resistance to chemicals and is emulsifier-free. The coating material is useful as a lacquer layer coating on metallic substates such as automobiles. The coating material is based upon a polyester oligomer/polyacrylate wherein the polyacrylate contains hydrophilic and hydrophobic portions and the polyester contains hydroxyl functions. Capped polyisocyanates are also included in the coating material.

14 Claims, No Drawings

EMULSIFIER-FREE, HEAT-CURABLE COATING MATERIAL, ITS PREPARATION AND USE

The invention relates to a heat-curable coating material based on self-emulsifying copolymers, in particular based on polyester oligomer/polyacrylates mixed with capped polyisocyanate and a neutralising agent, which may contain conventional lacquer additives such as pigments, fillers and/or organic solvents. The aqueous coating material can be used for preparing finishes, in particular multi-layered finishes as a base lacquer, preferably as a clear lacquer.

The build-up of multi-layered finishes is known in particular in the motor vehicle construction sector. There, it is convenient to apply a clear lacquer layer onto a base lacquer layer "wet-on-wet", after a brief drying period, whereupon mutual stoving can take place.

Aqueous lacquers, especially clear lacquers, are described in the literature. A multi-layered finish with a clear lacquer coating as a finishing layer is described in DE-PS 28 06 497, wherein this clear lacquer should also be water-dilutable. Water-dilutable clear lacquers, however, are not defined. Polyesters with a high molecular weight and high viscosity, dissolved in xylene, which may be mixed with acrylic resins, are used as a base lacquer coating. This type of lacquer has a high neutralising agent requirement. DE-OS 36 32 617 describes aqueous coating materials based on highly effective resins, for example polyester resins, in which resin particles, which may be acrylic resins, are dispersed. The materials obtained are unstable and subject to rapid phase separation.

DE-OS 35 37 855 describes the use of acid polycondensates based on acrylic resins and polyetherpolyols, which may be used, after neutralisation, as water-dilutable binders for preparing water-dilutable storing fillers, finishing lacquers or clear lacquers. The polyetherpolyols used here do not lose their high hydrophilicity, even after stoving, so that the resistance to atmospheric moisture and sulphuric acid of these systems is inadequate.

EP-A-0 365 775 also describes the use of acid polyacrylates which are used to prepare water-dilutable finishing lacquers, after neutralisation and dilution. Here, a melamine resin is used as a cross-linking agent. The additional use of oligomers is not described, nor is cross-linking with capped polyisocyanates. In addition, this coating material still has unsatisfactory high-solids values (HS values), that is they require a large amount of organic solvent, of the order of magnitude of 27 g or more, with reference to 100 g of resin solids (corresponding to an HS value of 73 or less).

In the older, not part of the prior art, German Patent 42 23 183, aqueous emulsions based on acrylic copolymers are described, which are synthesised in the presence of one or more low molecular weight polyesters and are then cross-linked with a mixture of melamine resins and capped polyisocyanates.

DE-A-38 32 826 describes a process for the preparation of a coating based on a water-dilutable polyacrylate resin and an amino resin. Polymerisation of the polyacrylate resin in the presence of a polyester is not mentioned.

This polymerisation technique is described in DE-A-39 10 829. Here, however, water-dissolved resins are always used, not aqueous emulsions. Also not described in DE-A-39 10 829 is the preparation of an acrylate resin with hydrophilic and hydrophobic blocks.

The object of the invention is the provision of aqueous coating materials with a low organic solvent content, which lead to coatings with high resistance to chemicals, in particular high resistance towards acids and oil/carbon black and with a very low tendency to turn yellow.

It has been shown that this object is achieved by an emulsifier-free, heat-curable coating material in the form of an aqueous emulsion, this being the object of the invention, and containing:

A) 30 to 80 wt. % of one or more polyester oligomer/ polyacrylates which can be diluted with water, after neutralisation with bases, obtainable by the radical polymerisation of 50 to 95 wt. % of one or more esters of unsaturated carboxylic acids with hydrophobic and hydrophilic portions, wherein
  a) the hydrophobic portions are based on monomeric esters of unsaturated carboxylic acids with secondary OH groups, which may be present mixed with comonomers which contain no OH groups and
  b) the hydrophilic portions are based on monomeric esters of unsaturated carboxylic acids with primary OH groups and monomeric esters of unsaturated carboxylic acids with COOH groups, which may be present mixed with comonomers which contain no OH groups, wherein the number ratio of primary to secondary OH groups arising from components b) and a) is 1:1.5 to 1:2.5 in the copolymers, in 5 to 50 wt. % of one or more polyester oligomers with hydroxyl functions, obtainable by polycondensation of diols and/or polyols with one or more dicarboxylic acids and/or their derivatives, optionally with the joint use of one or more monoalcohols and/or monocarboxylic acids, with a final molecular weight of 200 to 1000, preferably 300 to 600, a hydroxyl value of 100 to 600, preferably 200 to 500 and an acid value of 0 to 15, preferably 0–1.5, wherein the monomers a) and b) are used in amounts such that the polyester oligomer/polyacrylate obtained has a hydroxyl value of 100 to 390, an acid value of 16 to 50, preferably 20 to 30 and a number average of the molecular weight (Mn) of 1000 to 10000, preferably 2000 to 5000 (each wt. % being with reference to the solids content and adding up to 100);

B) 70 to 20 wt. % of one or more capped polyisocyanates, and/or one or more melamine resins, wherein, however, at least one of the melamine resins is a hexamethoxymethylmelamine resin, wherein the percentages by weight of components A) and B) each relate to the weight of solids in the resins and add up to 100 wt. %, and the ratio of OH groups in component A) and capped NCO groups in component B) is 0.5:1 to 2:1, preferably 0.8:1 to 1.2:1, as well as water and optionally one or more organic solvents, pigments, fillers, catalysts and/or auxiliary substances and additives which are commonly used in lacquers.

If component B) in the coating material according to the invention consists of capped polyisocyanates, then component A) is preferably present in an amount of 30 to 70 wt. %, particularly preferably 40 to 60 wt. %, and component B) is preferably present in an amount of 70 to 30 wt. %, particularly preferably 60 to 40 wt. %.

If component B) in the coating material according to the invention represents one or more melamine resins, then component A) is preferably present in an amount of 80 to 55 wt. %, and component B) preferably in an amount of 20 to 45 wt. %.

The binder component A) in the coating material according to the invention may be prepared by polymerisation of components a) and b) to give polyester oligomers. For example, the procedure may involve initially introducing 20 to 50 parts by weight (with reference to the solids in A)) of at least one hydroxy-functional polyester oligomer, as defined above, and polymerising therein 80 to 50 parts by weight (with reference to the solids in A)) of esters of unsaturated carboxylic acids with hydrophobic and hydrophilic portions, based on the previously defined components a) and b). In this case, the parts by weight of components a), b) and polyester oligomers add up to 100 parts by weight. The amounts by weight of components a) and b) are selected so that the number ratio of primary to secondary OH groups in the copolymers obtained (without taking into account the OH groups in the polyester oligomers) is 1:1.5 to 1:2.5.

The hydrophobic portion a) of component A) in the coating material according to the invention is obtained by copolymerisation of esters of unsaturated carboxylic acids with an alcohol component which still contains at least one secondary hydroxyl group, in the presence of a polyester oligomer. Examples of unsaturated carboxylic acids for the unsaturated ester monomers are (meth)acrylic acid (here and in the following, (meth)acrylic is intended to mean methacrylic and/or acrylic), maleic acid and crotonic acid. The alcohol component in the ester monomers based on unsaturated carboxylic acids preferably contains 3 to 25 carbon atoms. It may be based on short-chain aliphatic alcohols, long-chain aliphatic alcohols and on condensation products of alcohols or glycidyl compounds with fatty acids.

For simplification, the self-emulsifying copolymers in component A) are also referred to as acrylic copolymers in the following. However, they are only preferably based on monomers which are based on esters of (meth)acrylic acid; the simplifying expression includes the esters of other unsaturated carboxylic acids, as defined above.

Examples of hydrophobic monomers with secondary OH functions are:

hydroxypropyl (meth)acrylate, adducts of glycidyl (meth)acrylate and saturated short-chain fatty acids with $C_1$–$C_3$-alkyl groups, e.g. acetic acid or propionic acid, and adducts of Cardura E (the glycidyl ester of versatic acid) with unsaturated COOH-functional compounds, such as e.g. acrylic or methacrylic acid, maleic acid, crotonic acid, adducts of Cardura E with unsaturated anhydrides such as e.g. maleic anhydride, reaction products from glycidyl (methacrylate) with saturated branched or unbranched fatty acids with $C_4$–$C_{20}$-alkyl groups, e.g. butanoic acid, caproic acid, lauric acid, palmitic acid, stearic acid.

The hydrophilic portion b) of component A) in the coating material according to the invention is prepared from monomers based on esters of unsaturated carboxylic acids, such as (meth)acrylic acid, maleic acid and crotonic acid with at least one primary OH group in the alcohol section. The alcohol component in the unsaturated ester monomers may have, for example, 2 to 18 carbon atoms.

Examples of monomers for forming the hydrophilic portion of component A) are:

hydroxyalkyl esters of acrylic acid and/or methacrylic acid with one primary OH and a $C_2$–$C_3$-hydroxyalkyl group such as hydroxyethyl (meth)acrylate, and hydroxyalkyl esters of acrylic acid and/or methacrylic acid with one primary OH group and a $C_4$–$C_{18}$-hydroxyalkyl group such as butandediol monoacrylate, hydroxyhexyl acrylate, hydroxyoctyl acrylate and the corresponding methacrylates and reaction products of hydroxyethyl (meth)acrylate with caprolactone.

The hydrophilic portions in component A) also contain carboxyl groups and carboxyl-functionalised monomers, such as e.g. acrylic acid, methacrylic acid and crotonic acid, are used for their introduction when preparing component A). Other carboxyl-functionalised monomers which can be used are unsaturated anhydrides such as maleic anhydride, and semi-esters of maleic anhydride formed by the addition of saturated aliphatic alcohols such as e.g. ethanol, propanol, butanol and/or isobutanol.

When preparing component A), other comonomers may jointly be used which do not contain OH groups. Examples of these are long-chain, branched or unbranched unsaturated monomers such as alkyl (meth)acrylates with $C_8$–$C_{18}$ chains in the alkyl section, e.g. ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, lauryl acrylate, isobornyl (meth)acrylate and 4-tertiary-butylcyclohexyl methacrylate. Other examples are short- and medium-chain, branched or unbranched unsaturated monomers such as alkyl (meth)acrylates with $C_1$–$C_7$ chains in the alkyl section, e.g. methyl (meth)acrylate, ethyl (meth)acrylate, propyl (meth)acrylate, butyl (meth)acrylate, isobutyl (meth)acrylate, tertiary-butyl (meth)acrylate, pentyl (meth)acrylate, hexyl (meth)acrylate and cyclohexyl (meth) acrylate. Aromatic vinyl compounds such as styrene and styrene derivatives such as vinyltoluene and p-methylstyrene may also jointly be used as comonomers.

The amounts of the other comonomers may be selected so that the desired specifications with regard to molecular weight, ratio of OH groups, OH value and acid value are met.

As mentioned, copolymers in component A) are prepared by the copolymerisation of components a) and b) in the presence of a polyester oligomer. This is a radical copolymerisation in which the amounts of monomer and polyester oligomer are balanced so that the desired specifications with regard to molecular weight, ratio of OH groups, OH value and acid value are produced.

Preparation takes place, for example, as a radical solution polymerisation in the presence of a polyester oligomer and a radical initiator, as is known by the person skilled in the art. Examples of radical initiators are dialkyl peroxides, such as di-tert.-butyl peroxide, di-cumyl peroxide; diacyl peroxides such as di-benzoyl peroxide, di-lauryl peroxide; hydroperoxides such as cumene hydroperoxide, tert.-butyl hydroperoxide; peresters such as tert.-butyl perbenzoate, tert.-butyl perpivalate, tert.-butyl per-3,5,5-trimethylhexanoate, tert.-butyl per-2-ethylhexanoate; peroxydicarbonates, such as di-2-ethylhexyl peroxydicarbonate, dicylcohexyl diperoxydicarbonate; perketals, such as 1,1-bis-(tert.-butylperoxy)-3,5,5-trimethylcyclohexane, 1,1-bis-(tert.butylperoxy)cyclohexane; ketone peroxides, such as cyclohexane peroxide, methyl-isobutyl ketone peroxide and azo compounds, such as 2,2'-azo-bis-(2,4-dimethylvaleronitrile), 2,2'-azo-bis-(2-methyl-butyronitrile), 1,1'-azo-bis-cyclohexanecarbonitrile and azo-bis-isobutyronitrile.

The polymerisation initiators are generally added in an amount of, for example, 0.1 to 4 wt. %, with reference to the amount of monomer initially introduced.

Radical polymerisation may be performed in a one-pot process with the production of a statistical distribution of hydrophobic and hydrophilic portions.

The procedure may be such that all the monomers required and the initiator(s) are mixed in a storage vessel. This mixture is then metered into a mixture of one or more solvents and polyester oligomers, or polyester oligomers alone, at a temperature of e.g. 140° C., with stirring, over a period of e.g. 5 hours. The copolymers produced then have a statistical distribution of primary and secondary hydroxy and carboxy functions.

However, it is also possible to perform block polymerisation to produce copolymers with hydrophobic and hydrophilic blocks.

The conventional method of working may be used to prepare block copolymers. For example, a mixture of hydrophobic monomers (optionally together with other comonomers) are initially polymerised, then hydrophilic monomers (optionally together with other comonomers) are introduced and polymerisation is continued. In practice, it is possible, for example, initially to introduce a mixture of hydrophobic, hydroxy-functional monomers, (meth)acrylates and optionally e.g. vinylaromatic compounds and then to introduce a further mixture of hydrophilic, hydroxy-functional monomers, (meth)acrylates, vinylaromatic compounds and COOH-functional monomers. The copolymers produced in this way then have one hydrophobic and one hydrophilic chain end, which gives these copolymers, for instance, an emulsifier character.

By copolymerising components a) and b) in the presence of polyester oligomers, when preparing component A), the amount of solvent used, and optionally later removed by distillation, can be greatly reduced. In fact, it is possible to avoid a solvent altogether and simply use the polyester oligomer as solvent for the preparation of component A).

The polyester oligomers used when preparing component A) may be prepared e.g. from one or more diols and/or polyols, optionally in the presence of one or more monoalcohols, by condensation with one or more dicarboxylic acids and/or their derivatives. Polycondensation takes place by conventional methods which are familiar to the person skilled in the art, for example in the presence of conventional esterification catalysts and, for example, at elevated temperatures of e.g. 180° to 230° C. in the molten state.

Examples of polyols which can be used are those with more than two OH groups, such as aliphatic triols and tetraols with 2 to 6 carbon atoms, such as trimethylolethane, trimethylolpropane, glycerol, 1,2,4-butanetriol, 1,2,6-hexanetriol and pentaerythritol.

It is also possible to jointly use one or more monofunctional alcohols, such as e.g. monoalcohols with branched or unbranched alkyl groups, with for example 1 to 20 carbon atoms. Examples of these are methanol, ethanol, propanol, isopropanol, lauryl alcohol and stearyl alcohol.

Examples of the dicarboxylic acids are aliphatic saturated and unsaturated dicarboxylic acids, such as e.g. maleic acid, fumaric acid, succinic acid, adipic acid, azelaic acid, sebacic acid; cycloaliphatic saturated and unsaturated dicarboxylic acids and aromatic dicarboxylic acids, such as phthalic acid, isophthalic acid, tetra-, hexa- and endomethylenetetrahydrophthalic acid, endoethylenetetrahydrophthalic acid and cyclohexanedioic acid (1,2; 1,3 and 1,4), itaconic acid, muconic acid and camphoric acid or optionally the possible anhydrides of these acids.

It is also possible jointly to use monofunctional carboxylic acids such as, e.g. acetic acid, propionic acid, benzoic acid, lauryl acid or stearyl acid.

Examples of diols which can be used are aliphatic diols such as e.g. ethylene glycol, propylene glycol (1,3 and 1,2), butanediol, hexanediol-1,6, neopentyl glycol, 2-butyl-2-ethyl-propanediol-1,3; polyetherglycols of ethylene and propylene with up to 6 monomer units, such as diethylene glycol, triethylene glycol, tetraethylene glycol and hexaethylene glycol; and cycloaliphatic diols such as 1,3-dimethylolcyclohexane and 1,4-dimethylolcyclohexane.

Coating agents according to the invention may contain one or more capped polyisocyanates as a cross-linking agent (component B). Examples of polyisocyanates which can basically be used for the capped polyisocyanates are cycloaliphatic, aliphatic or aromatic polyisocyanates such as tetramethylene diisocyanate, hexamethylene diisocyanate, 2,2,4-trimethylene diisocyanate, 1,12-dodecane diisocyanate, cyclohexane-1,3 and -1,4 diisocyanate, 1-isocyanato-3,3,5-trimethyl-5-isocyanato-methylcyclohexane (=isophorone diisocyanate IPDI), perhydro-2,4'- and/or -4,4'-diphenylmethane diisocyanate, 1,3- and 1,4-diphenylene diisocyanate, 2,4- and 2,6-toluylene diisocyanate, diphenylmethane-2,4' and/or -4,4' diisocyanate, 3,2'- and/or 3,4-diisocyanato-4-methyl-diphenylmethane, naphthylene-1,5 diisocyanate, triphenylmethane-4,4'4" triisocyanate, tetramethylxylylene diisocyanate or mixtures of these compounds.

In addition to these simple isocyanates, those which contain hetero atoms in the groups linking the isocyanate groups are also suitable. Examples of these are polyisocyanates which contain carbodiimide groups, allophanate groups, isocyanurate groups, urethane groups, acylated urea groups and biuret groups.

Particularly suitable for the invention are the known polyisocyanates which are generally used for preparing lacquers, e.g. modification products of the simple isocyanates mentioned above which contain biuret, isocyanurate or urethane groups, in particular tris-(6-isocyanatohexyl)-biuret or lower molecular weight polyisocyanates which contain urethane groups, such as may be obtained by reacting IPDI, used in excess, with simple polyhydric alcohols with molecular weights in the range 62–300, in particular with trimethylolpropane. Obviously, any mixture of the polyisocyanates mentioned may also be used to prepare the products according to the invention.

Suitable polyisocyanates are also known prepolymers which contain terminal isocyanate groups, such as are obtainable in particular by reacting the simple polyisocyanates mentioned above, especially diisocyanates, with smaller amounts of organic compounds with at least two groups which are reactive towards isocyanate groups. Preferred compounds for use are those which possess a total of at least two amino groups and/or hydroxyl groups and a number average molecular weight of 300 to 10000, preferably 400 to 6000.

The ratio of isocyanate groups to hydrogen atoms which can react with NCO groups in these known prepolymers is 1.05 to 10:1, preferably 1.1 to 3:1, wherein the hydrogen atoms are preferably on hydroxyl groups.

Otherwise, the type and ratio by amounts of starting materials used for preparing NCO prepolymers are selected in such a way that the NCO prepolymers have a) an average NCO functionality of 2 to 4, preferably 2 to 3, and b) a number average molecular weight of 500–10000, preferably 800–4000.

The isocyanate groupings on the polyisocyanates are fully capped. Conventional capping agents may be used as capping agents, such as are used, for example, in the lacquer sector. Examples of capping agents are dimethyl malonate, diethyl malonate, ethyl acetoacetate, epsilon-caprolactam, acetanilide, acetylacetone, acetoxime, propanediol-1,2 and/or butanoxime, wherein the last named capping agent is preferred.

Capping of the polyisocyanates may be performed e.g. by heating one or more polyisocyanates with the capping agent. For example, one or more polyisocyanates may initially be introduced and heated with stirring to e.g. about 80° C., and the capping agent added (for example over about 10 minutes). Stirring is continued until the NCO value is less than 0.1%. It is also possible to cap one or more polyisocyanates with a mixture of two or more capping agents.

The advantage of using two or more different polyisocyanates and/or two or more different capping agents is that cross-linking can take then place over a wide temperature range. The coating films being cross-linked (lacquer films) are thus also only partially cross-linked over a relatively long period of time, which means that the removal of water, co-solvents or capping agent can take place over a long time without impairing the surfaces.

Cross-linking component B) may consist of one or more melamine resins, wherein at least one melamine resin must be a hexamethoxymethylmelamine resin (HMMM). The melamine resins which are combined with HMM melamine resins may be water-soluble or water-insoluble.

Examples of hexamethoxymethylmelamine resins (HMM melamine resins) are commercial products such as e.g. Maprenal 900 or Maprenal 904. They may require an external acid catalyst such as e.g. p-toluenesulphonic acid in order to cross-link. The acid catalyst may be blocked ionically with amines such as e.g. triethylamine or non-ionically such as e.g. with Cardura E, the glycidyl ester of versatic acid.

Examples of water-insoluble amine resin cross-linking agents for the coating agents according to the invention are water-insoluble melamines which have been etherified with butanol or isobutanol, such as e.g. the commercial product Setamin US 138 or Maprenal MF 619, and mixed etherified melamines, which have been etherified with both butanol and methanol, such as e.g. Cymel 254.

Examples of water-soluble or water-compatible melamine resins are e.g. methyl etherified melamines such as e.g. Cymel 325, Cymel 327, Cymel 350, Cymel 370 and Maprenal MF 927.

The advantage of using two or more different melamine resins is that the cross-linking can take place over a wide temperature range. The coating films (lacquer films) being cross-linked are thus also only partially cross-linked over a relatively long period of time, which means that the removal of water and co-solvents can take place over a long time without impairing the surfaces.

However, it is always necessary to use at least one HMMM resin, because this imparts in particular a high resistance to acids to the cross-linked coating material.

The coating materials according to the invention may contain the normal lacquer solvents in amounts of for example up to 20 wt. %, e.g. 5 to 20 wt. %. Examples of this type of solvent are organic solvents such as aliphatic and aromatic hydrocarbons, for example toluene, xylene, mixtures of aliphatic and/or aromatic hydrocarbons and esters, ethers and alcohols.

To prepare the coating agents, the usual additives (e.g. pigments, fillers, auxiliary agents and additives) may be added, such as those currently used in the lacquer sector. The amounts are generally in the usual range known to the person skilled in the art.

Examples of such additives are pigments, for instance colouring pigments such as titanium dioxide or carbon black and special effect pigments such as metal flake pigments and/or pigments which provide a pearly lustre. The binder compositions provided according to the invention are particularly suitable for coating materials which contain this type of special effect pigment. They preferably contain special effect pigments together with colouring pigments or colouring pigments together with fillers. Other examples of additives are the usual lacquer fillers, such as e.g. talc and silicates, and auxiliary agents and additives such as plasticisers, light-protective agents, stabilisers and flow controllers such as silicone oils and catalysts. These are also used in the usual amounts which are known to the person skilled in the art.

The usual methods familiar to the person skilled in the art are used to prepare aqueous emulsions. Thus, for example, components A) and B) are mixed together, neutralised and emulsified. It is also possible to neutralise component A) first and then to admix the cross-linking component B), water being used for emulsifying.

In practice, the procedure may be such that, for example, a solvent-containing polyester oligomer/acrylate optionally has the solvent largely removed, preferably by distillation under reduced pressure. Then the resin is partially or completely neutralised with bases. In this case, the bases commonly used with lacquers are used, such as ammonia or tertiary amines, e.g. triethylamine, dimethylethanolamine or triethanolamine. This neutralisation may take place, for instance, by the slow introduction of bases over the course of, for example, 5 minutes. Then one or more capped polyisocyanates may also be metered into the still warm polyester oligomer/acrylate mixture, this taking place, for instance, over a period of 5 to 10 minutes.

Finally, completely deionised water is metered into the hot resin mixture, e.g. over 60 to 90 minutes, for example under intensive mixing. Production of the dispersion may be assisted by heating the aqueous phase. Suitable mixing units are, for example, high-speed stirrers or rotor/stator mixers. It is also possible to improve the results of dispersion by means of high-pressure or ultra-sonic homogenisers. The process may be performed continuously or batchwise. An aqueous oil-in-water emulsion is obtained which is storage-stable and can be adjusted with water without any problems to give lower solids contents which are suitable for application. Additives, such as pigments, fillers and other additives may be added, if they are required, during preparation of the emulsions and/or after their preparation.

It is also possible completely or partially to neutralise the polyester oligomer/acrylate with bases and then to emulsify with enough water to produce a water-in-oil emulsion. The water-in-oil emulsion can subsequently be stored and then mixed with particular additives and cross-linking agents when preparing the coating material (lacquer production) and adjusted to the viscosity appropriate for application using water or solvent/water mixtures. This method has the advantage that the additives and cross-linking agents are added to the resin phase and not, as is sometimes undesirable, to the aqueous phase.

The aqueous emulsions obtained have e.g. a high HS value of 80 to 90. They may have, for example, a solids range of 25 to 55 wt. %, with reference to the final dispersion. They may optionally be diluted with water, e.g. to a suitable spraying viscosity, for application.

The coating materials according to the invention are suitable for coatings which adhere to a number of substrates such as, for example, wood, textiles, plastic, glass, ceramic and in particular metal.

The coating material according to the invention is applied by known methods such as e.g. spraying, immersion, rolling or spreading. The coating agent is applied to the substrate which has optionally already been provided with other lacquer layers. Following an evaporation phase, the applied coating material is cross-linked by heating. The stoving temperatures are e.g. 100° to 180° C., preferably 110° to 160° C. The thickness of the stoved film is about 15 to 50

μm. A cross-linked, hard, glossy and acid-resistant lacquer coating is produced in this way.

The cross-linking process may optionally be catalysed. Conventional lacquer catalysts are suitable for this such as, for example, dibutyltin dilaurate. Addition of a catalyst is particularly preferred when using polyisocyanates as component B). Melamine resins in particular may also be used without a catalyst.

One preferred embodiment is application of the coating material according to the invention as a clear lacquer coating on a base lacquer, preferably an aqueous base lacquer. In this case, a wet-on-wet procedure may be used, or the base lacquer is first dried by heating. Particularly good adhesion between the two layers is obtained in this way.

When the coating materials are formulated without any pigment as a clear lacquer, base lacquers which contain, for example, conventional covering pigments, may be over-lacquered. Preferably these contain special effect pigments such as e.g. metal pigments. Polyesters or polyurethane or acrylate resins are preferably used as the basis of the binder in the base lacquer. These binders may optionally be cross-linked by means of cross-linking agents, e.g. melamine or isocyanate derivatives.

A few examples of other base lacquers, which may preferably be coated with the pigment-free clear or pigment-containing finishing lacquers prepared according to the invention, are given in the following.

Water-based lacquers based on 50 to 95 wt. % of an aqueous emulsion polymer with epoxide functions and 95 to 5 wt. % of an anionic polyurethane dispersion with an acid value of 5 to 10. Poly(meth) acrylate resins (for example in an amount of up to 20 wt. %) in particular are suitable as paste resins for pigments and additives used in such water-based lacquers. Examples of such water-based lacquers are described in DE-OS-3 628 124.

Base lacquers based on polyesters with a glass transition temperature of >30° C., melamine resins (e.g. partially butylated melamine resins), polyurea plasticisers (for example based on an adduct of butylurethane and formaldehyde) and a copolymer of polyethylene (85 wt. %) and vinylacetate (15 wt. %) as a wax dispersion. Such base lacquers may contain the usual additives such as cellulose acetobutyrate (for example with various ranges of molecular weight). Examples of such base lacquers are described in EP-A-187 379.

An example of a base lacquer based on a solvent, which is particularly suitable for repair purposes, contains physically dried binders based on a thermoplastic polyester and/or acrylate resin mixed with cellulose ethers or cellulose esters and/or polyvinylacetates. These may also contain self-curing acrylic resin binders which contain colouring pigments and have hydrogen atoms which react with isocyanate, as well as additional mixtures of cellulose ethers and/or cellulose esters and/or cellulose semi-esters dissolved in solvents. Such lacquers are described in e.g. DE-OS-29 24 632.

Other examples of base lacquers are described in DE-A-42 28 510.

All the base lacquer formulations mentioned above may contain the usual lacquer additives, as well as the usual fillers and colouring pigments and also metallic pigments such as aluminium or stainless steel bronzes and other special effect pigments.

Examples of base lacquers which may be coated with clear lacquers based on the coating materials according to the invention are also coating powders such as are described, for example, in "Products Finishing", April 1976, pages 54 to 56.

The coating agents according to the invention may also be formulated as a base lacquer and also as a filler. In this case they are particularly good for preparing multi-layered finishes, e.g. in the motor vehicle sector. The usual additives, such as were described e.g. above for a base lacquer, may be added when formulating as a base lacquer or filler.

In comparison with conventional base lacquers, base lacquer coatings according to the invention produce improved resistance to moisture and heat, due to the particularly good cross-linking effect.

Base lacquers according to the invention may be over-lacquered with conventional clear lacquers, using a wet-on-wet procedure, optionally after a brief drying period. They are preferably over-lacquered with clear lacquers based on coating materials according to the invention.

The coating materials according to the invention are particularly suitable for finishing lacquers or clear lacquers and base lacquers, which are preferably used in the motor vehicle sector, but may also be used in other fields. Use of the coating material according to the invention in multi-layered finishes is particularly appropriate for automobile finishes, but they can also be used for other purposes, such as e.g. for domestic appliances or in the furniture industry, in order to obtain coatings which are especially stable towards acids.

In the following examples, parts and percentages refer to weight.

EXAMPLE 1

Preparing a Polyester Oligomer 336.7 g of trimethylolpropane, 366.8 g of adipic acid and 197 g of hexanediol are esterified to an acid value of 20 using 5 g of hypophosphorous acid, in a 2 liter 3-necked flask fitted with a stirrer, separator, thermometer and reflux condenser, at 180° to 230° C. in the molten state.

Then the mixture is condensed under vacuum to an acid value of less than 1.5.

The product obtained in this way has a stoving residue of 94.5% (1 h, 150° C.), a viscosity of 3200 mPas (100% strength), a hydroxyl value of 460 and a colour value of 30 Haze.

EXAMPLE 2

Preparing a Polyester Oligomer/Acrylate Resin

| | |
|---|---|
| 505.6 g | butyl diglycol |
| 561.8 g | polyester oligomer from example 1 |
| 1421.4 g | glycidyl ester of versatic acid (Shell Trade Name: "Cardura E10") | are initially introduced into a 6 liter 4-necked flask which is fitted with a stirrer, reflux condenser, dropping funnel and thermometer, and heated to 144° C. with stirring. Then a mixture of

| | |
|---|---|
| 196.7 g | lauryl acrylate |
| 196.7 g | styrene |
| 393.3 g | isobutyl acrylate |
| 398.9 g | butanediol monoacrylate |
| 556.2 g | acrylic acid |
| 612.4 g | isobutyl methacrylate |
| 22.5 g | di-tert.-butyl peroxide |
| 134.9 g | tert.-butyl peroctoate | is added over a period of 5 hours. Polymerisation is continued for another 2 hours at 144° C. The resin has a solids content of 88.3% (1 h 150° C.), an acid value of 26 mg KOH/g and a viscosity of 7600 mPas.

EXAMPLE 3

Preparing an Aqueous Polyester Oligomer/Acrylate Emulsion 634 g of the polyester oligomer/acrylate resin described in example 2 is heated to 40° C. with stirring in a 2 liter 3-necked flask fitted with a stirrer, thermometer and dropping funnel. Then the mixture is neutralised by adding 15.8 g of dimethylethanolamine. Afterwards, 350.2 g of fully deionised water is added over 30 minutes, with stirring. The emulsion obtained then has a solids content of 55.1% (1 h, 120° C.).

EXAMPLE 4

Preparing a Capped Polyisocyanate Cross-linking Mixture 666 parts of the isocyanurate of isophorone diisocyanate (Vestanat-T-1890 from Hüls), 573 parts of the isocyanurate of hexamethylene diisocyanate (Tolonate HDI from Rhone-Poulenc) and 500 parts of butyl acetate are initially introduced into a 4 liter 4-necked flask fitted with stirrer, internal thermometer, reflux condenser and dropping funnel and heated to 80° C. 525 parts of butanoxime are added dropwise over the course of one hour. The reaction mixture is reacted at 80° C. until an NCO content of less than 0.1 wt. % is achieved. After the addition of 190 parts of butyl diglycol, a vacuum is applied and the butyl acetate is distilled off at a max. of 85° C.

The cross-linking agent obtained has a solids content of 90% and is highly viscous.

EXAMPLE 5

Preparing a Capped Polyisocyanate Cross-linking Mixture 666 parts of the isocyanurate of isophorone diisocyanate (Vestanat-T-1890 from Hüls), 573 parts of the isocyanurate of hexamethylene diisocyanate (Tolonate HDT from Rhone-Poulenc), 124 parts of tetramethylxylylene diisocyanate and 500 parts of butyl acetate are initially introduced into a 4 liter 4-necked flask fitted with stirrer, internal thermometer, reflux condenser and dropping funnel, and heated to 80° C. 660 parts of butanoxime are added dropwise over the course of one hour. The reaction mixture is reacted at 80° C. until an NCO content of less than 0.1 wt. % is achieved. After the addition of 225 parts of butyl diglycol, a vacuum is applied and the butyl acetate is distilled off at a max. of 85° C.

The cross-linking agent obtained has a solids content of 90% and is highly viscous.

EXAMPLE 6

Preparing a Water-dilutable Clear Lacquer 200 g of the aqueous polyester oligomer/acrylate emulsion from example 3 and 100.8 g of the capped polyisocyanate mixture from example 4 were mixed for several minutes under intensive stirring and then 3.1 g of a commercially available sterically hindered amine (HALS) were added. Lastly, 55 g of fully deionised water were added. The mixture was then adjusted to a spraying viscosity using 7.6 g of fully deionised water.

EXAMPLE 7

As in example 6 but using the polyisocyanate from example 5 and 17 g of fully deionised water for the final adjustment.

The lacquers from examples 6 and 7 were applied to a commercially available base lacquer with a processing viscosity of 30" $AK_4$ at 20° C. in a conventional wet-on-wet process in two spraying processes to give dry films of 30 to 45 μm. The films obtained were left for the solvent to be released (evaporated) for 6 minutes after application, pregelled for 10 minutes at 80° C. and then stoved for 20 minutes at 150° C. They then possessed an exceptional hardness, a very high gloss and satisfied the industrially usual oil/carbon black tests (Opel specification GME 60403) without the surface being modified.

EXAMPLE 8

Preparing a Water-dilutable Clear Lacquer 592 g of the aqueous polyester oligomer/acrylate emulsion from example 3 and 61.5 g of a HMMM resin (Cymel 303®) and 29.2 g of a butanol etherified melamine resin (Maprenal MF 3615®) are mixed together under intensive stirring and then 2.0 g of a commercially available acid catalyst are added. Lastly, 286 g of fully deionised water are added. The mixture is finally adjusted to a spraying viscosity with 20 g of fully deionised water.

EXAMPLE 9

Preparing a Water-dilutable Clear Lacquer

The same procedure as in example 8 was used, but the melamine resin was replaced by 29.2 g of Setamin US-138® and
61.5 g of Maprenal MF 904®

EXAMPLE 10

The lacquers from examples 8 and 9 were applied to a base lacquer with a processing viscosity of 30" $AK_4$ at 20° C. in a conventional wet-on-wet process in two spraying processes to give dry films of 30 to 45 μm. The films obtained were left for the solvent to be released (evaporated) for 6 minutes after application, pre-gelled at 80° C. for 10 minutes and then stoved at 150° C. for 20 minutes. They then possessed an exceptional hardness, a very high gloss and satisfied the industrially usual oil/carbon black tests (Opel specification GME 60403) without the surface being modified.

We claim:

1. An emulsifier-free heat-curable coating agent comprising:
    A) 30 to 80 wt. % of at least one polyester oligomer/polyacrylate produced by the radical polymerization of 50 to 95 wt. % of at least one ester of an unsaturated carboxylic acid having a hydrophobic portion and at least one ester of an unsaturated carboxylic acid having a hydrophilic portion, in the presence of 5 to 50 wt. % of at least one polyester oligomer with a hydroxy function, which oligomer is produced by the polycondensation of at least one diol or polyoyl or combination thereof, and at least one dicarboxylic acid, the polyester oligomer having a molecular weight of 200 to 1000, a hydroxyl number of 100 to 600 and an acid number of 0 to 15, wherein;
- a) the ester of the unsaturated carboxylic acid having the hydrophobic portion is a monomeric ester of an unsaturated carboxylic acid having a secondary hydroxyl group on the alcohol residue of the ester, or its mixture with at least one unsaturated carboxylic acid ester comonomer which contains no hydroxyl group on the alcohol residue of the ester, and
- b) the ester of the unsaturated carboxylic acid with the hydrophilic portion is a mixture of a monomeric acid of an unsaturated carboxylic acid having a primary hydroxyl group on the alcohol residue of the ester, and a monomeric ester of an unsaturated carboxylic acid having a carboxylic acid group on the alcohol residue of the ester, or an unsaturated carboxylic acid or a combination thereof, and wherein;
the number ratio of the primary to secondary hydroxyl groups of components a) and b) is 1:1.5 to 1:2.5 in the polyester oligomer/polyacrylate produced by the polymerization,
the monomers a) and b) are used in amounts that produce the polyester oligomer/polyacrylate having a hydroxyl number of 100 to 390 and an acid number of 16 to 50 and a number average molecular weight of 100 to 10,000, and
each wt. % is with reference to the solids content and the sum equals 100 wt. %; and B) 70 to 20 wt. % of at least one capped polyisocyanate or at least one melamine resin, or a combination thereof, the melamine resin being at least a hexamethoxymethylmelamine resin;

the percentages by weight of components A) and B) relate to the total weight of solids of components A) and B) and the sum equals 100 wt. %, and, provided that if a polyisocyanate is present, the ratio of hydroxyl groups in component A) to NCO groups in component B) is 0.5:1 to 2:1.

2. A coating agent according to claim 1, wherein the polyester oligomer is produced by copolycondensation of the diol or polyoyl or combination thereof and the dicarboxylic acid, and at least one monoalcohol and at least one monocarboxylic acid.

3. A coating agent according to claim 1, wherein component B) comprises at least 2 capped polyisocyanates which differ with respect to the formulas of their polyisocyanate groups or their capping groups or both.

4. A coating agent according to claim 1, comprising an emulsion in water produced by neutralizing component A with base before or after combining component A with component B.

5. A coating agent according to claim 4, further comprising a component selected from the group consisting of at least one organic solvent, at least one pigment, at least one catalyst, at least one filler, at least one auxiliary agent, at least one lacquer additive, and any combination thereof.

6. A process for preparing the coating agent according to claim 1, comprising:
radical polymerizing 95 to 50 parts by weight of at least one ester of an unsaturated carboxylic acid having a hydrophic portion and at least one ester of an unsaturated carboxylic acid having a hydrophilic portion, in the presence of 5 to 50 parts by weight of at least one polyester oligomer having a hydroxyl function, which oligomer is produced by the polycondensation of at least one diol or polyoyl or combination thereof with at least one dicarboxylic acid and has a molecular weight of 200 to 1000, a hydroxyl number of 100 to 600 and an acid number of 0 to 15, to produce a polyester oligomer/polyacrylate copolymer as Component A,

- a) the ester of the unsaturated carboxylic acid having the hydrophobic portion being a monomeric ester of an unsaturated carboxylic acid having a secondary hydroxyl group on the alcohol residue of the ester, or its mixture with a monomeric ester of an unsaturated carboxylic acid which contains no hydroxyl groups; and
- b) the ester of the unsaturated carboxylic acid having the hydrophilic portion being both a monomeric ester of an unsaturated carboxylic acid having a primary hydroxyl group on the alcohol residue of the ester, and a monomeric ester of an unsaturated carboxylic acid having a carboxylic acid group on the alcohol residue of the ester, or an unsaturated carboxylic acid or a combination thereof;

monomers a) and b) being used in amounts that produce Component A having a hydroxyl number of 100 to 390, and an acid number of 16 to 50, and a number average molecular weight of 100 to 10,000, and the number ratio of primary to secondary hydroxyl groups produced in Component A from components a) and b), without taking into account the hydroxyl groups in the polyester oligomer being 1:1.5 to 1:2.5, and the parts by weight being with reference to the total weight of solids and equal 100 parts by weight, and mixing 30 to 80 wt. % of Component A with 70 to 20 wt. % of Component B which is at least one capped polyisocyanate or at least one melamine resin, or a combination thereof, provided that if a capped polyisocyanate is used as Component B, the ratio of hydroxyl groups in Component A to NCO groups in Component B is 0.5:1 to 2:1 and provided that if a melamine resin is used as Component B, it is at least a hexamethoxymethylmelamine resin.

7. A process according to claim 6, further comprising emulsifying the mixture of Components A and B in water before or after neutralizing Component A with base.

8. A process according to claim 6, further comprising combining with Components A and B a further component selected from the group consisting of at least one organic solvent, at least one pigment, at least one filler, at least one auxiliary agent, at least one lacquer additive, and any combination thereof.

9. A coating layer on a substrate produced by application of the coating agent according to claim 5, to the substrate wherein the additional component is at least a pigment.

10. A clear lacquer layer on a substrate produced by application of the coating agent according to claim 4, in pigment-free form.

11. A base lacquer layer on a substrate produced by application of the coating agent according to claim 5 containing at least a pigment.

12. A multiple layer on a substrate produced by application of a coating agent according to claim 5 in pigmented form to produce a base lacquer layer, application of a coating agent according to claim 5 containing a filler component to produce a filler layer and application of a coating agent according to claim 4 in pigment-free form to produce a clear lacquer layer.

13. A layer according to claim 9, 10, 11 wherein the substrate is a motor vehicle.

14. A layer according to claim 12 wherein the substrate is a motor vehicle.

* * * * *